May 7, 1957　　　　H. BRANDI ET AL　　　　2,791,416
HEATING FURNACE PLANT TO BE HEATED WITH LEAN GAS
Filed May 24, 1954　　　　　　　　　　　　　　2 Sheets-Sheet 1

INVENTORS
HERMANN BRANDI
& JAKOB WILLEMS
BY
ATTORNEY

INVENTORS
HERMANN BRANDI
& JAKOB WILLEMS
BY
ATTORNEY

United States Patent Office 2,791,416
Patented May 7, 1957

2,791,416

HEATING FURNACE PLANT TO BE HEATED WITH LEAN GAS

Hermann Brandi, Duisburg-Hamborn, and Jakob Willems, Duisburg-Meiderich, Germany, assignors to Huttenwerke Phoenix Aktiengesellschaft, Duisburg-Ruhrort, Germany Application May 24, 1954, Serial No. 431,928

Claims priority, application Germany May 26, 1953

1 Claim. (Cl. 263—15)

In heating furnaces for operation with lean gas, such as blast furnace gas, in which steel or semi-finished steel products and the like are to be heated, the required temperature can only be reached when air enriched with oxygen is used. The enrichment of the combustion air with oxygen is rarely economical. It has, therefore, become customary to pre-heat gas and air in recuperators operated with the waste gases of the furnace, more particularly in the metallurgy of iron, when furnaces are used which are operated with lean gas.

Usually the operation of the known heating furnaces provided with recuperators is discontinuous. Each furnace has its own recuperator unit. At the start, a cold charge, consisting for instance of blocks or billets, is fed into the furnace, which has to be heated up to about 1300° C. In order to make the rate of heating-up sufficiently high, a considerable amount of gas is necessary to start with, the amount being all the higher the lower is the temperature of the waste gases entering the recuperator. At the end of the heating-up period, when the waste gas temperatures are high, considerably less gas is needed for heating up the blocks, since at that time gas and air are already pre-heated to high temperature. However, in that period of heating up, there is the risk of damage to the recuperators because of the high waste gas temperature. In order to avoid such damage, cooling air has to be blown into the recuperator in addition to the hot air, a measure which is not only uneconomical, but can be downright harmful to the preheater.

With the known heating furnaces for operation with lean gas with associated recuperators for gas and air, the efficiency of the recuperator and the absorptive capacity of the burners has to be adjusted at all times for the largest amount of gas possible, due to the considerable variations of the required gas and air quantities during a heating period, although the quantities needed at the end of the heating-up may be only about ⅓ to ¼ of the initially required quantities. If the amount of gas were to remain the same throughout, recuperators could be used with an efficiency which is lower by about 25–30%. In any case, in the known plants and operations comprising heating furnaces provided with recuperators, the pre-heaters have to come up to very high specifications. If, in the course of the operation, they become defective, the whole furnace plant would come to a standstill.

One suggestion to overcome these drawbacks might be to operate two adjacent heating furnaces in such a manner that one of the furnaces is fed with a cold charge, when the other one is at the end of its heating-up period. The latter is working at high waste gas temperatures, which could be used for pre-heating the combustion gases and the air of the furnace fed with the cold charge, whereas the waste gases of that first furnace may be used for further heating-up the furnace being already at high temperature. Such an operational method is, however, not satisfactory, since the hot furnace provides considerably lower amounts of waste gas than the cold one. With the small amount of waste gas furnished by the hot furnace, the temperature of the large amount of heating gas and combustion air needed for the cold furnace cannot be sufficiently affected.

The present invention solves the problem of providing a uniform and economical operation for heating furnaces operated by lean gas by basing it on a new principle.

According to the invention, several furnaces are combined in a furnace group, in which the waste gases of each furnace are conducted to a collective pipe, to which are connected all the recuperators associated with the furnace. For complete mixture of the waste gases, the collective conduit or pipe is preferably designed in the shape of a double-T. With such an arrangement, each furnace takes from its pre-heaters such an amount of gas and air as it will need for the heating-up period. The necessary quantity of heat for the various recuperators can be adapted to the requirements by known controls.

In the group arrangement according to the invention, it is desirable to operate the furnaces in such a way that one of the furnaces is fed with a cold charge, while one other furnace has reached the final temperature, and yet other furnaces are still operating in the heating-up period. The waste gases of all the furnaces are collected in the common conduit and are mixed therein. By this method, it is possible to obtain in all recuperators even waste gas temperatures, and as an added advantage, there is no risk of over-heating. Since, with an even heating of the pre-heaters the furnaces are provided from the start of the heating-up period with heating gases and combustion air of a constant high temperature, the furnaces with cold charge, even at the beginning, require a smaller amount of gas than usual. On the other hand, there is no danger of burning the charge or destroying the recuperator at the end of the heating-up period. Also, the uneconomical blowing-in of cooling air into the recuperator can be omitted.

It is a further advantage of considerable importance in the plant according to the invention that the recuperators need no longer be adjusted for highest possible gas quantities (as it used to be in the known plants), due to the practically constant gas consumption of the furnaces over the entire heating-up period. The recuperators may now be calculated for a mean output computed about 20% below the usual.

According to the invention, the heating furnaces can be connected directly to the gas and air outlets of their recuperators. On the other hand, it is possible to provide common hot air and hot gas conduits for the recuperators, which are then connected to the individual furnaces. In this manner, the individual pre-heaters may be connected to any desired furnace. This has the advantage that upon break-down of any one recuperator, nevertheless all furnaces can still remain in operation.

Any number of recuperators may, in such an arrangement, be used, as long as the total efficiency is borne in mind. To rely on a single recuperator is, however, not advantageous, since the break-down of that one recuperator would lead to the stand-still of the entire group of furnaces.

A single smoke stack will be sufficient for the entire group of furnaces. The regulation of the waste gas fed to the recuperators and that of hot air and hot gas is done by the usual control means.

A heating furnace plant according to the invention will now be described by way of example, but it should be understood that this is done by way of illustration and not of limitation and that many changes in the details can be made without departing from the spirit of the invention.

In the annexed drawings.

In the plant of heating furnaces 1–4 of a known arrangement, each furnace has its own gas and air recuperators G and L. The recuperators are heated by way of pipes 5–8 by means of the waste gases of their associated furnaces.

Figure 1:
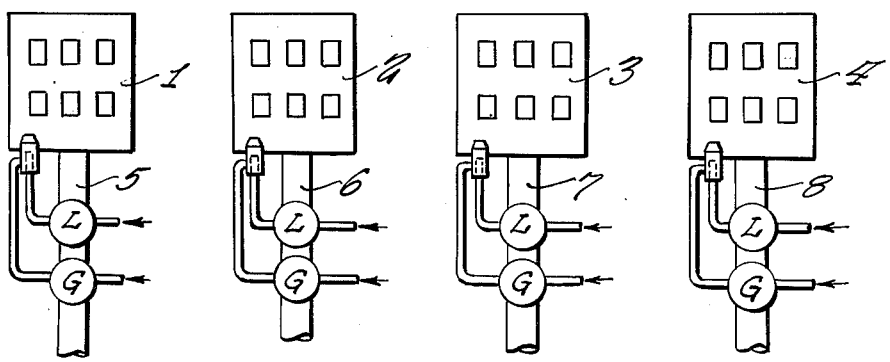
Figure 1 is a diagrammatic showing of a known heating furnace plant.
Figure 2:
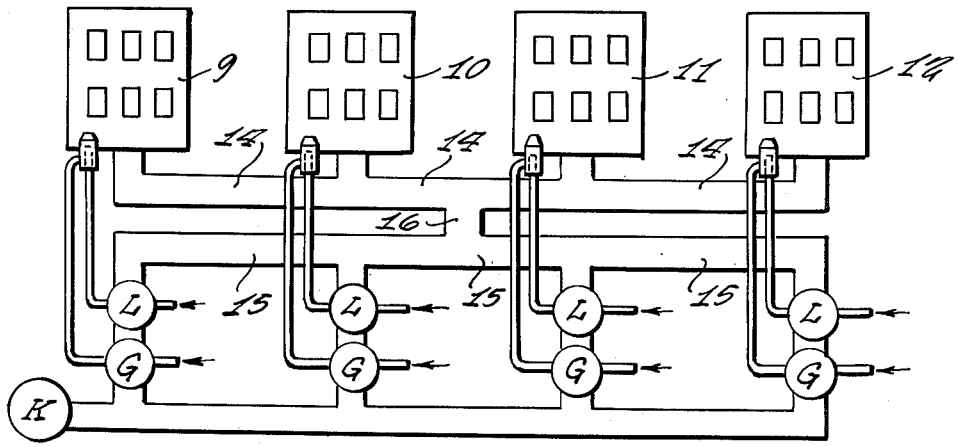
Figure 2 is a diagrammatic showing of a novel heating furnace plant according to the invention.

In contradistinction thereto, in the plant of heating furnaces according to the invention, shown in Figure 2, the furnaces 9–12 are combined in a group, their waste gases escaping into a common conduit from which the recuperators G and L derive their waste gas. The common conduit preferably comprises two branch conduits 14, 15 which are interconnected by a transverse pipe 16. The waste gas conduit thus has the shape of a double T which guarantees a particularly thorough intermingling and distribution of the waste gases.

Figure 3:
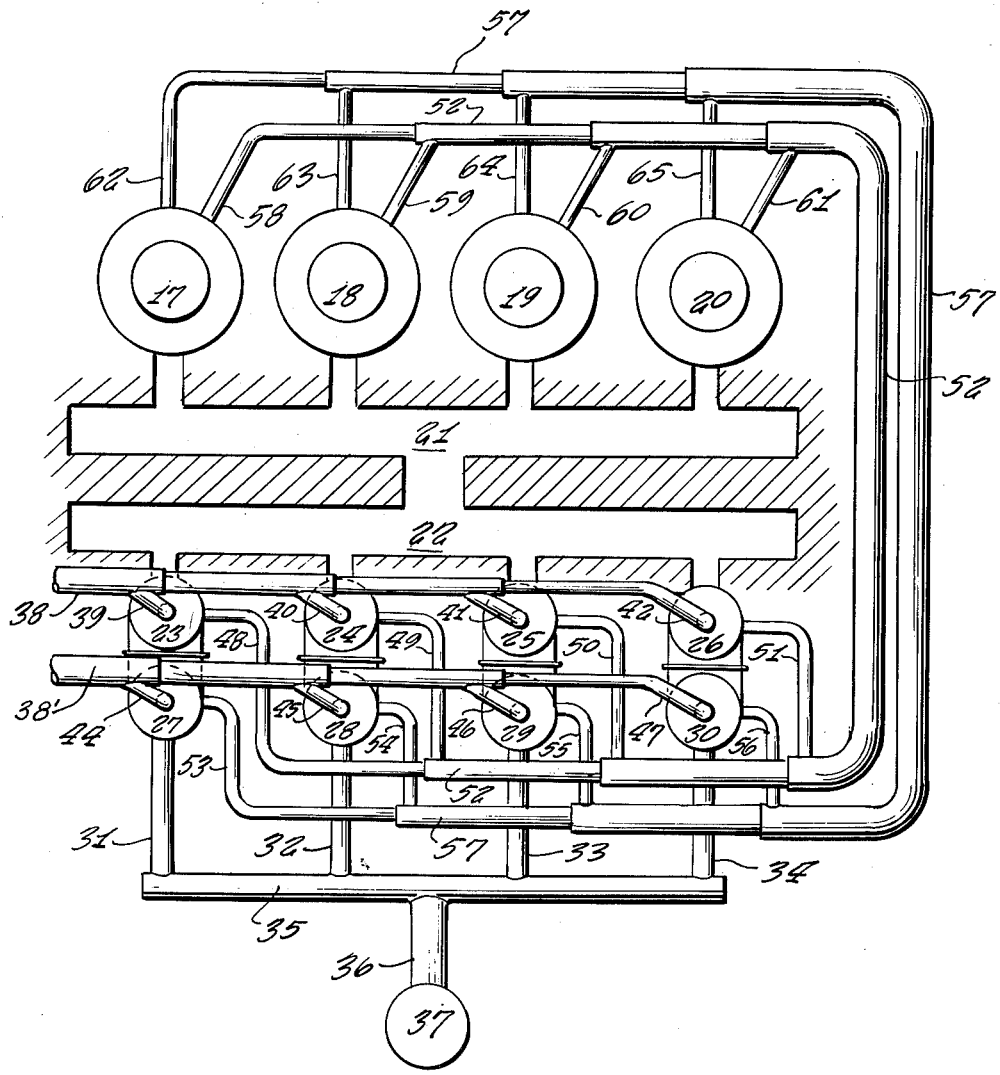
Figure 3 is another embodiment of a plant according to the invention, likewise in diagrammatic illustration.

Figure 3 illustrates diagrammatically a particularly advantageous system of connections of air and gas passages:

The heating furnaces 17–20 are again connected to the interconnected waste gas conduits 21 and 22. The pre-heaters for air 23–26, and the pre-heaters for gas 27–30, are heated from these conduits. The waste gases escape from the plant through pipes 31–36 to an exhauster 37.

Cold air is introduced into the pre-heaters for air 23–26 through a main pipe 38 by short connecting pipes 39–42, whereas a collective conduit 43 having short connecting pipes 44–47 feeds the gas to be heated to pre-heaters for gas 27–30.

The pre-heated air escapes from the pre-heaters 23–26 by short pipes 48–51 leading to a hot air main 52. Pre-heated gas enters a hot gas main 57 through short pipes 53–56. From the two mains 52 (hot air) and 57 (hot gas), short pipes 58–61 and 62–65, respectively, lead to the burners (not shown) of heating furnaces 17–20.

The system of connections according to the invention is particularly adapted for pre-heating furnaces for steel blocks, as well as for heating up said furnaces and maintaining them at high temperature. This system of connections may also be used for other heating furnaces used in the iron industry, glass industry, or ceramic industry.

What we claim is:

A heating furnace plant for steel material being composed of a plurality of furnaces operated discontinuously and heated with lean gas, wherein the recuperators are provided for pre-heating of gas and air, said plurality of furnaces having a common main conduit for receiving the waste gases from each individual furnace, the conduit being in the shape of a double T with two elongate ducts, a set of pipes for connecting each individual furnace to one of said ducts, and another set of pipes for connecting each individual recuperator to the other one of said ducts; a further common duct for collecting waste gases from said recuperator and individual connecting pipes from said recuperators to said last-mentioned waste gas duct, an exhaustor for the escape of the collected waste gases from said last-mentioned duct, a common main conduit for admission of cold air, a common main conduit for admission of cold gas for the recuperators, individual pipes for connecting the recuperators to said common main conduits, and common main conduits for hot air and a common main conduit for hot gas and connecting pipes from the individual furnaces to said conduits for hot air and hot gas, respectively, and connecting pipes from the recuperators to said common main conduit for hot air and hot gas, respectively.

References Cited in the file of this patent

UNITED STATES PATENTS

| | | |
|---|---|---|
| 1,535,351 | Stairs | Apr. 21, 1925 |
| 2,501,476 | Nichols | Mar. 21, 1950 |
| 2,514,084 | Mowat | July 4, 1950 |
| 2,689,722 | Knight | Sept. 21, 1954 |